July 1, 1930.   C. D. BURNEY ET AL   1,768,541
LIGHTER-THAN-AIR AIRCRAFT
Filed Dec. 13, 1928   3 Sheets-Sheet 1
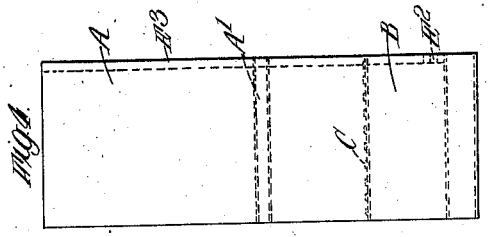
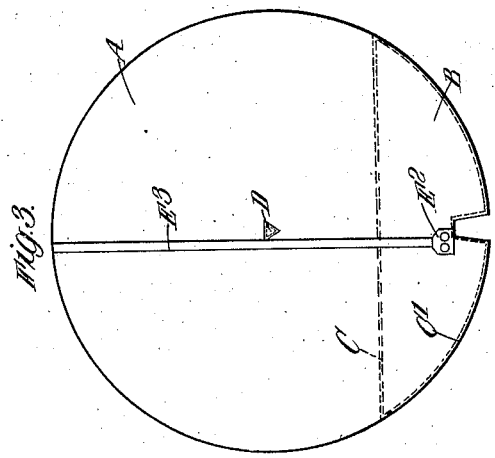
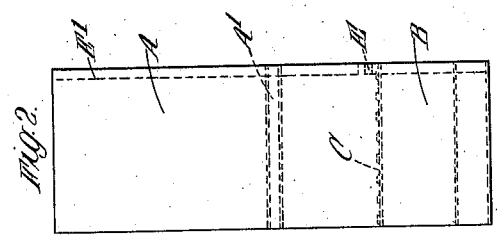
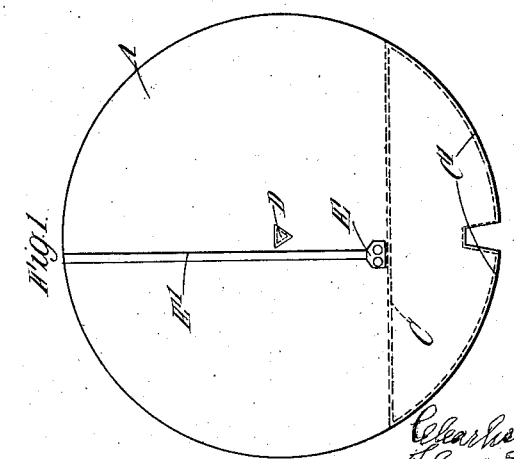

July 1, 1930. C. D. BURNEY ET AL 1,768,541
LIGHTER-THAN-AIR AIRCRAFT
Filed Dec. 13, 1928   3 Sheets-Sheet 2
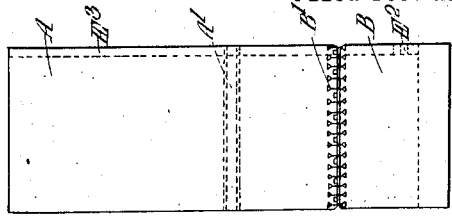
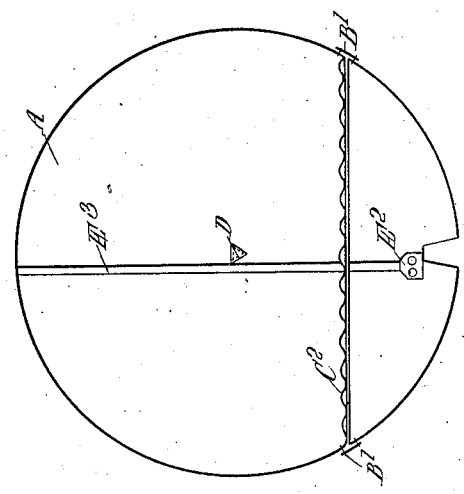
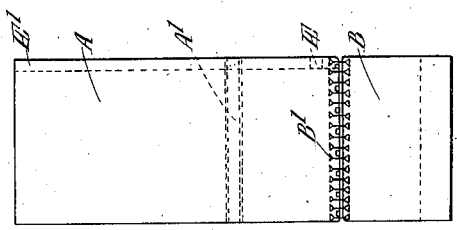
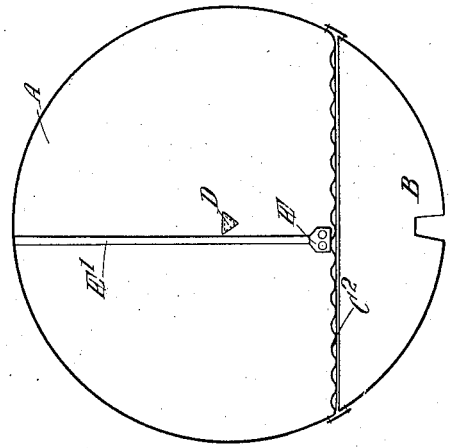
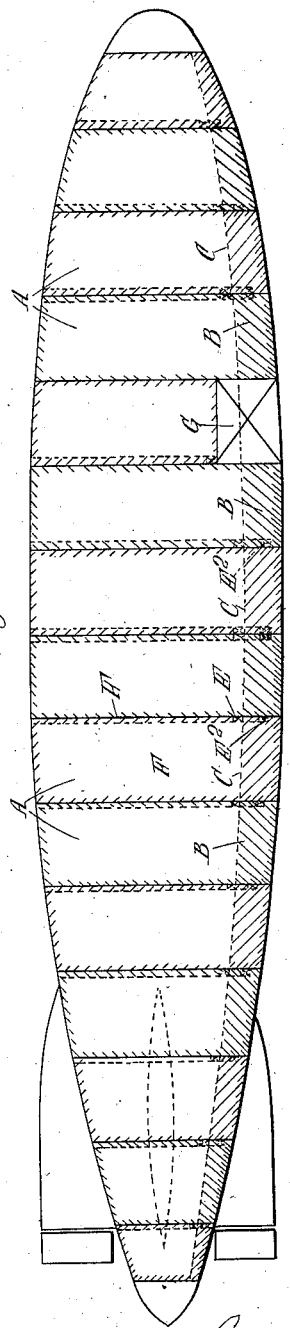

July 1, 1930.  C. D. BURNEY ET AL  1,768,541
LIGHTER-THAN-AIR AIRCRAFT
Filed Dec. 13, 1928  3 Sheets-Sheet 3
Fig. 10.
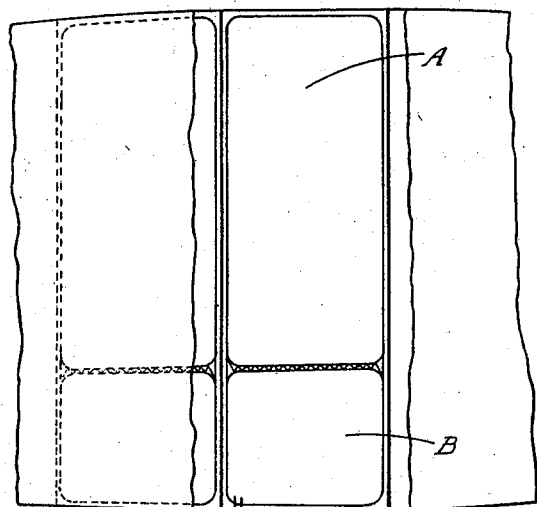
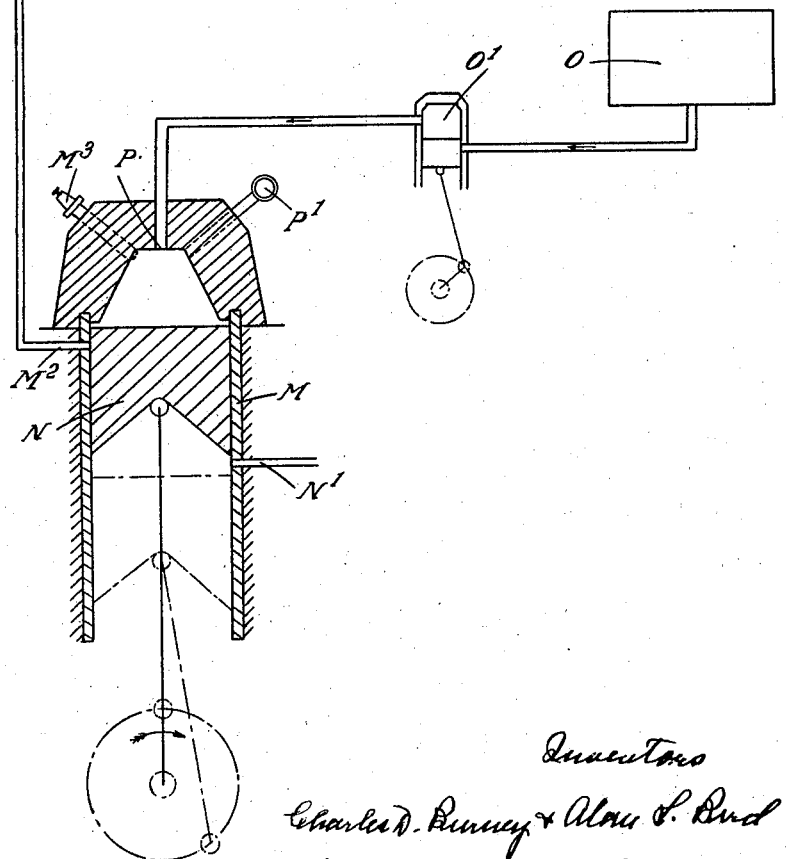

Patented July 1, 1930

1,768,541

UNITED STATES PATENT OFFICE

CHARLES DENNISTON BURNEY, OF WESTMINSTER, AND ALAN LANCE BIRD, OF CAMBRIDGE, ENGLAND, ASSIGNORS TO AIRSHIP GUARANTEE COMPANY, LIMITED, OF WESTMINSTER, ENGLAND, A BRITISH COMPANY

LIGHTER-THAN-AIR AIRCRAFT

Application filed December 13, 1928, Serial No. 325,812, and in Great Britain December 19, 1927.

This invention relates to lighter-than-air aircraft, hereinafter referred to as "airships", of the kind in which gas as well as liquid fuel is utilized as part of the fuel supply for the airship engines.

It has previously been suggested that, in order to compensate for the weight of liquid fuel burnt in the engines of an airship, an amount of hydrogen equivalent in lifting capacity to the weight of liquid fuel burnt in a given time should also be consumed in the engines, thus maintaining the ship in equilibrium and at the same time utilizing the calorific value of the hydrogen. The use of hydrogen is open to many disadvantages, for example, the heat value per unit volume is too low for the purpose for which the present invention is intended, while the use of hydrogen also entails excessive fire risks, owing to the high rate of flame propagation of hydrogen and air mixtures. The present invention specifically excludes the use of hydrogen or of gases containing any large percentage of free hydrogen.
It has also been proposed to employ, as the main fuel supply of the engine, fuel gas of a hydrocarbon character, which is of approximately the same specific weight as air, so that, as fuel gas is consumed and air is substituted therefor, substantially no static forces are imposed on the air ship, as would be the case if fuel gas of this character, which has the same specific weight as air, were employed in conjunction with liquid fuel, when static forces would be imposed on the airship due to the weight of the empty oil containers. It was also proposed to locate the fuel gas in cells situated below the lifting gas cells so that the lifting gas could press with a given pressure against the fuel gas; the consumption of fuel gas allowing the lifting gas to expand. According to this proposal, however, the ship is maintained in equilibrium owing to the fact that liquid fuel is not normally being burnt simultaneously with fuel gas and also to the fact that the specific weight of the fuel gas used is approximately the same as that of air, or, when the fuel gas employed is lighter than air, the gas is stored under pressure, so that its weight per unit volume is approximately the same as air.

In the case of a ship filled with helium this proposal would only provide a solution to half the problem, for, although an airship may be made lighter by burning liquid fuel, it is obviously impossible to reduce excess buoyancy by burning helium, and, since in this proposed arrangement the fuel gas carried is of the same specific weight as air, the only method of dealing with excess buoyancy would be by valving helium, a process which the present invention specifically obviates.

According to one feature of the present invention, the airship engines are adapted to consume simultaneously both liquid fuel and also gas of a hydrocarbon character, which gas is high in calorific value and has a density of between 50% and 80% of that of air. When this fuel gas or oil gas (hereinafter termed fuel gas) is burnt, the ship will automatically become less buoyant owing to the loss of lift of fuel gas, and in order that the ship may be maintained in equilibrium or become progressively more buoyant to a moderate extent instead of less so, a suitable percentage of the motive power of the airship, e. g. approximately 40%, is supplied by liquid fuel which is consumed simultaneously with the fuel gas. The fuel gas employed is one which is deficient in free hydrogen and preferably also in carbon monoxide and which contains methane, ethylene, as also in certain cases, higher gaseous members of these series, a gas of this character being obtainable, for example, by the cracking of a suitable hydrocarbon. The liquid fuel is preferably constituted by a relatively heavy hydrocabon, which will not vaporize at normal atmospheric temperatures, as is the case with light hydrocarbons such as benzene or petrol. The fuel gas and the liquid fuel may be consumed in separate engines or partly in separate engines or simultaneously in the same engine. It is preferred, however, to employ a fuel gas and a liquid fuel which can be consumed simultaneously in engines fired by a heating device as hereinafter explained. The ratio between the weights of the liquid fuel then required for the said engines and of the fuel gas carried makes it possible to arrange that the ship may be maintained in equilibrium or preferably become progressively more buoyant to any desired extent so that flexibility of control is attained It will be seen, therefore, that, if the proportions of liquid fuel and fuel gas which are burnt in the engines are so arranged that the lift of the ship destroyed by burning the fuel gas is exactly compensated for by the consumption of the required amount of liquid fuel, the ship will be maintained in equilibrium.

Suppose, however that temperature conditions alter rapidly, it will be possible either to increase or to reduce the amount of liquid fuel being consumed, with the result that the ship may be made either lighter or heavier to compensate for alterations in temperature.

For the purpose of carrying on the present invention, the selected fuel gas is carried either in the same gas bags as the hydrogen, helium, or other lifting gas, or in such a manner that the pressure of the lifting gas is continuously and automatically transmitted to the fuel gas, the latter being allowed to escape under control to the atmosphere when varition of buoyancy is desired. For instance, one method of storing the gases and at the same time preventing their becoming to some extent mixed, as would be the case if they were put into the same bag, is to divide the gas bag into upper and lower compartments by a gastight or approximately gastight diaphragm disposed transversely of the gas bag at any desired height and so arranged that the pressure of the hydrogen is continuously and automatically transmitted to the fuel gas, the lifting gas being stored in the upper compartment and the fuel gas in the lower compartment. Both compartments are fitted with suitable valves, and the fuel gas if so desired and when necessary, may first be allowed to escape to the necessary extent instead of lifting gas. The advantage of this arrangement is that loss of lifting gas is altogether avoided or considerably reduced when the airship has for some reason to change its altitude to a considerable degree.

According to another feature of the present invention, and in cases where fuel gas deficient in free hydrogen and liquid fuel are simultaneously consumed in the same engine cylinder, the airship engines are partly or entirely of the type in which the charge in the engine cylinder is fired by a heating device, such as an electric spark, and the liquid fuel employed is one which is not normally ignitable by a spark, such as kerosene, paraffin, Diesel or fuel oil, or a mixture of these oils either with each other or with lighter hydrocarbons, the heat required for igniting the relatively heavy oil being supplied by the ignition of a mixture of fuel gas and air which mixture is itself ignitable by a spark or otherwise. In such cases the fuel gas is admixed with substantially the total theoretical volume of air required for its own combustion as also that of the liquid fuel and the mixture is admitted to the engine cylinder prior to or simultaneously with the liquid fuel so that the fuel gas and air mixture on ignition acts both as a primer and igniter for the liquid fuel, while also serving to heat the charge of air for the combustion of the liquid fuel. In other words, the heat required for the ignition of the liquid fuel is generated internally of the engine cylinder by the ignition of a charge of fuel gas and air, the fuel gas being one which is deficient in free hydrogen and preferably also in carbon monoxide, and which is introduced into the engine cylinder simultaneously with or prior to the relatively heavy liquid fuel and carries with it all, or substantially all, the air required for its own combustion as also that of the liquid fuel. The present invention, therefore, also enables a fuel, which cannot normally be ignited with a spark or other heating device, to be used in engines where the charge is fired electrically or by some other form of heating device. The liquid oil and the gas are preferably used in approximately the same proportions.

The fuel gas employed in such circumstances, is preferably constituted by so-called oil gas, that is to say, a gas which is obtained by the cracking of a hydrocarbon and which is deficient in free hydrogen, and preferably also in carbon monoxide, and which contains methane, ethylene, as also in certain cases, higher gaseous members of these series. When fuel or oil gas and a relatively heavy hydrocarbon are consumed simultaneously in engines where the charge is ignited by a heating device the gas employed, however, need not necessarily have a density of between 50% and 80% of that of air, and other gases such as coal gas, producer or water gas, but excluding hydrogen, which, when mixed with air, can be ignited by a spark or other heating device, may be used in certain circumstances. In such cases the ratio between the weight of liquid fuel then required for the said engines and the weight of fuel gas carried is so arranged that as liquid fuel and gas are consumed the ship is maintained in equilibrium, or it may be allowed to become progressively more buoyant to any desired extent.

In order that the said invention may be clearly understood and readily carried into effect the same will now be described more fully with reference to the accompanying drawing, in which, Figure 1 is an end view, and Figure 2 is a side view of a combined fuel gas and lifting gas bag constructed according to one embodiment of the present invention, an automatic lifting gas valve and trunk being associated with the lifting gas portion of the gas bag.

Figures 3 and 4 are corresponding views to Figures 1 and 2 showing an automatic fuel gas valve and trunk associated with the fuel gas portion of the gas bag.

Figures 5 and 6 are corresponding views to Figures 1 and 2, and

Figures 7 and 8 are corresponding views to Figures 3 and 4, showing constructions in which the fuel gas bag is separate from the lifting gas bag and attached thereto by patches and ties.

Figure 9 is a diagrammatic view of an airship fitted with a complete system of hydrogen and fuel gas bags, both the fuel gas bag section and the hydrogen gas bag section of each bag being fitted with separated hydrogen and fuel automatic gas valves and trunks.

Figure 10 is a diagrammatic illustration of part of an airship fitted with gas bags containing a section for holding fuel gas and a section for containing lifting gas, the fuel gas section being shown associated with an engine for consuming fuel gas simultaneously with liquid fuel in the air engines.

A is the lifting gas portion of the bag, and B is the fuel gas portion. C is the diaphragm which separates the lifting gas portion A from the fuel gas portion B. Lifting bands (not shown) may be attached to the diaphragm C for the purpose of transferring the lift to the axial girder D should the lifting gas portion A of the bag become partially deflated. The portion A of the gas bag is provided with an openig A' for accommodating the axial girder D. E is an automatically acting valve and E' is a trunk for valving off lifting gas. E² is an automatically acting valve and E³ is a trunk for valving off fuel gas, these valves and trunks being of any suitable construction, for example that described in our U. S. Patent No. 1,713,574 dated May 21, 1929.

The internal diaphragm C' (Figs. 1 to 4) and the lower part C² of the lifting gas bag A (Figs. 5 to 8) are so shaped that the fuel gas can be completely emptied from the bag portion B by the pressure exerted thereon by the lifting gas in the portion A of the bag, in which case the diaphragm C or the part C² occupies the space normally occupied by the fuel gas. C' (Figs. 1 and 3) shows in dotted lines the position of the diaphragm C when the fuel gas portion B is empty. B' (Figs. 5 and 6) are the patches and ties by which the lifting gas portion A and the fuel gas part B are attached together.

At Figure 9 a rigid airship is shown of the kind provided with an axial girder and with longitudinal girders and transverse frames, the passengers and crew being accommodated within compartments G situated within the body of the airship. Sixteen transverse frames F, F are provided, between each of which a bag comprising a lifting gas portion A and a fuel gas portion B is located, both the lifting gas portion A and the fuel gas portion B being fitted with automatic lifting gas valves and trunks E and automatic fuel gas valves and trunks E². The disposition of the fuel gas throughout the length of the ship is such that no gas bag has less than 10% of its volume occupied by fuel gas. This arrangement is adopted with the object of providing space in each bag for the expansion of the lifting gas as and when the fuel gas is consumed, thus allowing the vessel to reach a new pressure height without having to jettison the lifting gas unequally from any gas bag.

An advantage of the present invention is that the fuel gas and lifting gas bag portions can be provided with the same wiring system as is used at the present time for the lifting gas bags. A further advantage is that, owing to the very complete control of the balance of the ship during alterations of temperature, it is possible to dispense partly or entirely with the present type of manœuvering valve. It has been usual in all airships as previously constructed to fit each gas bag with two types of valves, viz: a manœuvering valve for valving off lifting gas under control and at will and a valve which acts automatically and valves off lifting gas if the pressure in the bag rises to a dangerous limit. When automatic valves are employed for the lifting gas bag portion and the fuel gas bag portions which are situated at or towards the bottom of the ship, as in the embodiments illustrated in the drawings, they do not provide a point of danger, because the lifting gas or the fuel gas cannot leak out of these valves under normal conditions. The manœuvering valves, however, have heretofore been situated at the top of the bag and in practice it has happened that these valves have failed to operate owing to their becoming congealed with ice and snow or for other reasons, with the result that the whole of the gas in the bag has escaped, thereby endangering the ship by virtue of the accidental loss of lifting gas. When a ship is fitted with the system forming the subject of the present invention, only a small number of bags need be fitted with manœuvering valves located in the upper or lifting gas compartment of the bag and these valves can be of the screw-down type adapted only to be operated in exceptional circumstances. Furthermore, being fewer in number, they can be of a type which is not dependent upon the use of springs or upon operation from a distant point.

A further advantage of using fuel gas which is lighter than air is that any fuel gas which leaks from the fuel gas portions of the bag will ascend to the top of the vessel and escape through hoods provided for the purpose in the outer envelope of the airship. Consequently, the fuel gas will not hang about the vessel, which would be the case if gas were used of the same specific gravity as air.

The advantage of locating the lifting gas and the fuel gas in compartments in which the pressure of the lifting gas is continuously and automatically transmitted to the lifting gas will be clear from the following example. Suppose, for instance, an airship with gas bags arranged as above described is suitably filled with lifting gas and fuel gas and it is desired to fly at a height of 2,000 feet, it will be necessary, if loss of gas is to be avoided, to fill the gas bags to approximately 90% of their capacity when on the ground. Upon the ship reaching 2,000 feet, which altitude in this case would be her "pressure height", the gas bags would be completely full owing to the expansion of the gas which has taken place due to the lower pressure at this height. If the ship proceeds upon her flight she will be burning every hour so many thousand cubic feet of fuel gas in her engines and thereby emptying the gas bags to that extent. Suppose that, after a few hours' flight, the ship meets some vertical gust or other condition which imposes a rapid rise in altitude, the gas in the bags will expand owing to this rise in altitude, but since a certain portion of the fuel gas has been removed from the bags during these hours of flight the remaining gas will be able to expand to an amount equal to the volume of the gas which has been withdrawn without any loss of gas. Had the hydrogen or lifting gas been contained in one container and the fuel gas in another quite separate container, then, since no lifting gas would have been used upon the flight by being drawn off to the engines, the lifting gas bag would be full and, when a rise in altitude took place lifting gas would be blown off and lost, with the result that, when the ship had passed through the meteorological conditions which imposed this rapid ascent and again returned to her previous altitude level, she would be less buoyant by the amount of lift lost by the escape of this lifting gas. The result would be that ballast or fuel would have to be jettisoned in order to compensate for this loss of lift. Accordingly, therefore, by this feature of the invention both hydrogen and ballast are conserved, the amount of conservation possible increasing with the duration of the flight.

In cases where manoeuvering valves are affixed to the lifting gas portion of the bag so that when operated by hand they allow lifting gas to escape, and when automatically acting valves are fitted to the fuel gas portion of the bag, the result will be that when blowing off occurs automatically, due to a constant rise in altitude, fuel gas will be dispelled instead of lifting gas. The advantage of this arrangement will be enhanced as the density of the fuel gas selected approximates more towards 80% than towards 50% of that of air, for the reason that, if the flexible diaphragm between the two portions of the bag be so arranged that expansion of the lifting gas can by forcing down the diaphragm completely empty the fuel gas through the automatic valves, the loss of lifting power will be represented by the difference between the volume of the fuel gas so lost and that of the increase in lifting gas, and, accordingly, when normal conditions are resumed the amount of ballast or fuel to be jettisoned will be reduced to the amount of the lift of the fuel gas so lost.

The flexible diaphragm between the two portions of the bag can, as aforesaid, be specially strengthened with lifting bands attached to the fabric of the diaphragm, so that, in the event of damage to the portion containing lifting gas and the upper part of the bag thus becoming deflated, the lift of the fuel gas will be transmitted by these bands to the axial girder running longitudinally along the centre of the ship.

Another advantage of selecting a fuel gas of a less density than air is that, by placing the engines to be operated by fuel gas at a higher level than the gas carried in the bags, the fuel gas flows easily to the engines without the necessity of pumping. Suitable arrangements are made to draw off the fuel gas from the bag to the engines, as for instance, by affixing to the upper portion of the fuel gas portion of the bag a flexible pipe freely perforated with holes and suitably strengthened to withstand compression.

In cases where liquid fuel and fuel gas are being simultaneously consumed the fuel gas is withdrawn under control from the fuel gas portion of the gas bags and after admixture with air the mixture may be forced in under pressure or drawn in by suction through the induction pipe during the suction stroke of the engine. The liquid fuel may be supplied through a float feed or other carburetter or otherwise admixed under control with the gas and air prior to its entry into the cylinder. The gas and air mixture may be employed to induce the requisite flow of fuel oil from the jet of the carburetter, the relative proportions of air, gas and fuel oil being controlled in any suitable manner or in the manner which is customary when air and petrol are used alone. The fuel gas under pressure may, however, be employed after the manner of an injector to atomize the oil, and/or to ensure the proper relative proportions of the mixture. This last mentioned method of carrying on the present invention is especially suitable for use in cases where kerosene or mixtures of kerosene and Diesel oil are being used. Alternatively, the gas and air may be injected or sucked into the engine cylinder during the suction stroke, the liquid fuel being thereafter injected under pressure into the cylinder at or about the end of the compression stroke or at the commencement of, or during, the firing stroke. This last mentioned arrangement is specially suitable for use with heavy oils, such as Diesel oil, and has the advantage of allowing an engine which is fired by a spark or other heating device to work at a much higher compression than usual and equivalent to or compatible with the compressions obtaining in engines of the semi-Diesel or Diesel type. Suitable arrangements may be made for atomizing the oil as it enters the cylinder and an air blast may also be used, if desired, with the fuel oil.

Referring to Figure 10, A is the lifting gas section of one of the gas bags of an airship, and B is the fuel gas containing section. M is an engine fired by a sparking plug $M^3$ and adapted for the simultaneous consumption of gaseous fuel and fuel oil. A charge of fuel gas is withdrawn from the gas bag B and enters the engine cylinder through the port $M^2$. On the piston N unclosing the air port $N'$ the total volume of air which is required for the combustion of the charge of fuel gas as also the charge of liquid fuel enters the cylinder through the port $N'$. O is the oil fuel tank, and $O'$ is a pump for withdrawing oil from the fuel tank and supplying the same to the engine cylinder N through the port P, the oil fuel being injected into the cylinder prior to the completion of the firing stroke. The gaseous fuel and air on ignition by the sparking plug $M^3$ acts both as a primer and igniter for the charge of fuel oil and also serves to heat the charge of air for the combustion of the liquid fuel, the products of combustion being discharged from the cylinder through the exhaust port $P'$.

The engine may be started upon a suitable gas and air mixture and be run as a gas engine until heated up. Thereafter the percentage ratio of air to gas can be increased and the fuel oil gradually admitted to the cylinder. Provision may also be made in certain cases for heating the induction pipe electrically or otherwise as and when required, to assist in vaporizing the fuel oil, or at starting. When stationary, the engine is preferably run on the gas and air mixture alone.

The advantages of the present invention are:—

(1) Fuel oils can be used in place of petrol, with a considerable saving in fuel cost; (2) a higher compression ratio can be used in the combustion of the fuel without producing detonations; (3) a higher thermal efficiency can be obtained with correspondingly increased fuel economy; (4) the fuel mixture imparts the advantages of a stratification engine.

The engine may be provided with an air and gas mixing chamber or gas carburetter together with regulators therefor, as also suitable valves and ignition devices, and, in addition, a pump for the fuel oil may be provided with a connection leading to a nozzle opening into the combustion chamber. The said pump and nozzle may be of any of the well known types which are suitable for injecting liquid fuel into the combustion chamber of engines, such as a cam-driven plunger pump operating over a comparatively small crank angle in conjunction with a fine orifice or orifices leading into the cylinder, or an eccentric-driven pump with valves operated mechanically or otherwise to time the period of injection may be employed. The nozzle may be provided with valves, automatic or mechanically operated, for controlling the injection of the fuel oil and may preferably be water-cooled. Blast air injection may be used if desired. The engine, which may preferably be arranged to have a degree of compression of the working fluid so as to avoid pre-ignition of the gaseous fuel, is normally started up on fuel gas and air, and may be used as long as desired in this manner, but, when desired, some of the gas is cut off by means of a regulator leaving sufficient to keep the engine firing, whereupon the injection of fuel oil is started. The ignition of the said fuel oil is accomplished, as aforesaid, by the burning of the gaseous fuel but the exact time of injection of the fuel oil may be a little before or a little after the time ignition of the gaseous fuel according to the type of combustion aimed at for the time being. The injection is continued until all the air not required for combustion of the gaseous part of the fuel is burned, or as much of it as is feasible.

It is to be understood that different gases will behave differently as the strength of mixture is reduced by the aforesaid regulation but it is found that the gases intended to be used have an available variation in mixture strength, without failure to ignite under conditions of compression, sufficient to leave a considerable amount of air to be burnt, and hence a considerable percentage of the power to be developed by the fuel oil.

We claim:
1. A method of controlling the equilibrium of an airship in which gaseous fuel as well as lifting gas is stored in the airship gas bags, which consists in consuming the gaseous fuel, together with liquid fuel which does not readily volatilize at normal temperatures simultaneously in the airship engines, the heat which is required for igniting the charge of liquid fuel being supplied by the ignition of a charge of the gaseous fuel which has been admixed with substantially the total air required for its own combustion as also that of the liquid fuel, so that the gaseous mixture on ignition acts both as a primer and igniter for the charge of liquid fuel, while also serving to heat the charge of air for the combustion of the liquid fuel.

2. A method of controlling the equilibrium of an airship as claimed in claim 1, which consists in introducing into an engine cylinder the total volume of fuel gas and air required for the combustion of the fuel gas as also a charge of liquid fuel and in thereafter injecting the liquid fuel into the cylinder prior to the completion of the firing stroke.

3. A method of controlling the buoyancy of an airship which consists in consuming fuel gas and liquid fuel which does not normally volatilize simultaneously in the airship engines, the fuel gas being carried in the gas bags containing the lifting gas in such a manner that the pressure of the lifting gas is continuously and automatically transmitted to the fuel gas, the latter being allowed to escape under control to the atmosphere when variation in buoyancy is desired.

4. A method of consuming fuel gas in airship engines as claimed in claim 3, wherein the gas bags are divided into two parts and whereby the pressure of the lifting gas is continuously and automatically transmitted to the fuel gas.

5. A method of controlling the buoyancy of an airship which consists in consuming simultaneously in the engines, liquid fuel which does not readily vaporize at normal atmospheric temperature as also gas of a hydrocarbon character high in calorific value and having a density of between 50% to 80% of that of air, the ratio between the weights of liquid fuel and gaseous fuel consumed being so arranged that the buoyancy of the ship is controlled by varying the relative proportions of liquid fuel and gaseous fuel consumed.

6. A method of controlling the buoyancy of an airship by consuming fuel gas and oil fuel simultaneously in the engine cylinders wherein the gas bags contain lifting gas in their upper portions and fuel gas in their lower portions, and wherein when blowing off occurs automatically due to a constant rise in altitude, fuel gas is dispelled instead of lifting gas.

In testimony whereof we have affixed our signatures.

CHARLES DENNISTON BURNEY.
ALAN LANCE BIRD.